(12) United States Patent
Tsukada et al.

(10) Patent No.: US 8,109,166 B2
(45) Date of Patent: Feb. 7, 2012

(54) TWIN CLUTCH SPEED-CHANGE APPARATUS

(75) Inventors: Yoshiaki Tsukada, Saitama (JP);
Takashi Ozeki, Saitama (JP); Hiroyuki Kojima, Saitama (JP); Yoshiaki Nedachi, Saitama (JP); Haruomi Sugita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 812 days.

(21) Appl. No.: 12/212,322

(22) Filed: Sep. 17, 2008

(65) Prior Publication Data

US 2009/0084210 A1      Apr. 2, 2009

(30) Foreign Application Priority Data

Sep. 28, 2007   (JP) .................. 2007-255125

(51) Int. Cl.
*F16H 3/08*       (2006.01)

(52) U.S. Cl. ............... 74/330; 74/333; 74/340; 74/352; 74/355

(58) Field of Classification Search ............. 74/330, 74/333, 340, 352, 355
See application file for complete search history.

(56) References Cited

U.S. PATENT DOCUMENTS

| | | | |
|---|---|---|---|
| 4,548,101 A * | 10/1985 | Akashi et al. ................. 74/720 |
| 6,044,719 A * | 4/2000 | Reed et al. ....................... 74/330 |
| 6,354,417 B1 | 3/2002 | Narita et al. |
| 7,197,954 B2 * | 4/2007 | Baldascini et al. ............. 74/331 |
| 7,305,900 B2 * | 12/2007 | Suzuki et al. ................... 74/340 |
| 7,428,852 B2 * | 9/2008 | Baldwin et al. ............... 74/337.5 |

FOREIGN PATENT DOCUMENTS

| | | |
|---|---|---|
| EP | 1770306 A1 | 4/2007 |
| EP | 1 826 053 A1 | 8/2007 |
| GB | 2 081 822 A | 2/1982 |
| JP | 57-29820 A | 2/1982 |
| JP | 59-73627 A | 4/1984 |
| JP | 2007-100739 A | 4/2007 |

* cited by examiner

*Primary Examiner* — Ha D. Ho
(74) *Attorney, Agent, or Firm* — Birch, Stewart, Kolasch & Birch LLP

(57) ABSTRACT

A twin clutch speed-change apparatus that can reduce shift shock includes a transmission with multiple gear pairs disposed between a main shaft and a countershaft. A twin clutch is provided on the main shaft, a rotational drive force from an engine being connected/disconnected between the transmission and the engine, a dog clutch is provided between an axially slidably attached slidable gear and an axially non-slidably attached non-slidable gear to select a gear pair, for transmitting a rotational drive force, from the multiple gear pairs. Dog teeth of the dog clutch include steps different in axial height from each other between a portion abutted against a lateral wall surface of a dog hole when the rotational drive force is transmitted by the dog clutch, and a portion abutted against a lateral wall surface of the dog hole when the rotational drive force is not transmitted by the dog clutch.

20 Claims, 12 Drawing Sheets

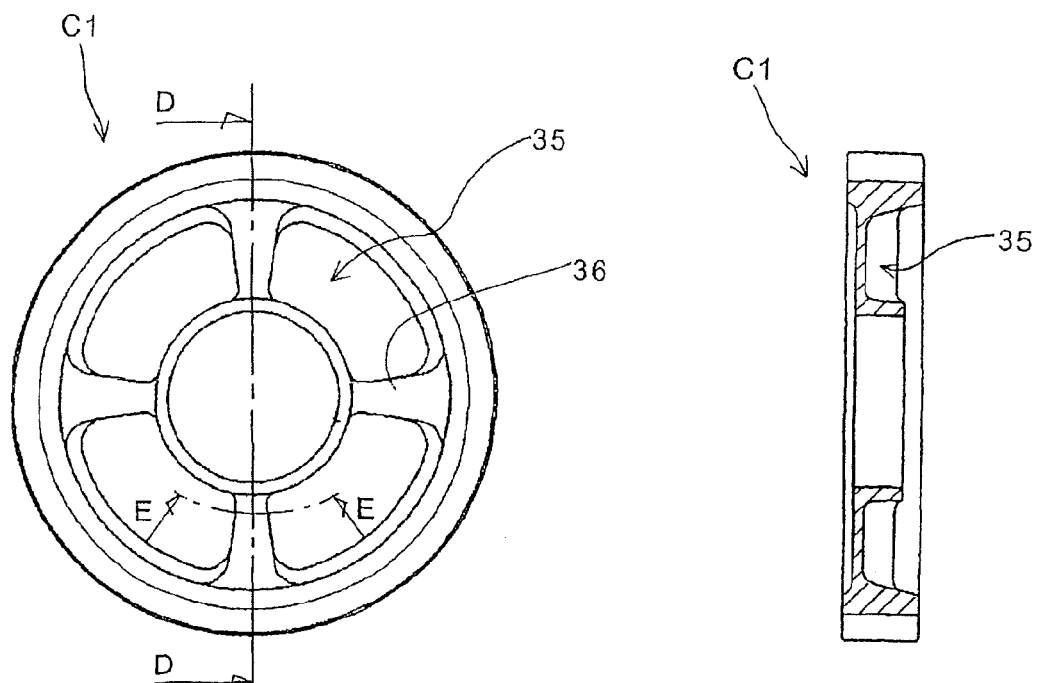
FIG.5A
FIG.5B
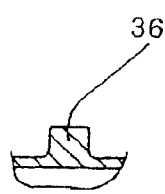
FIG.6

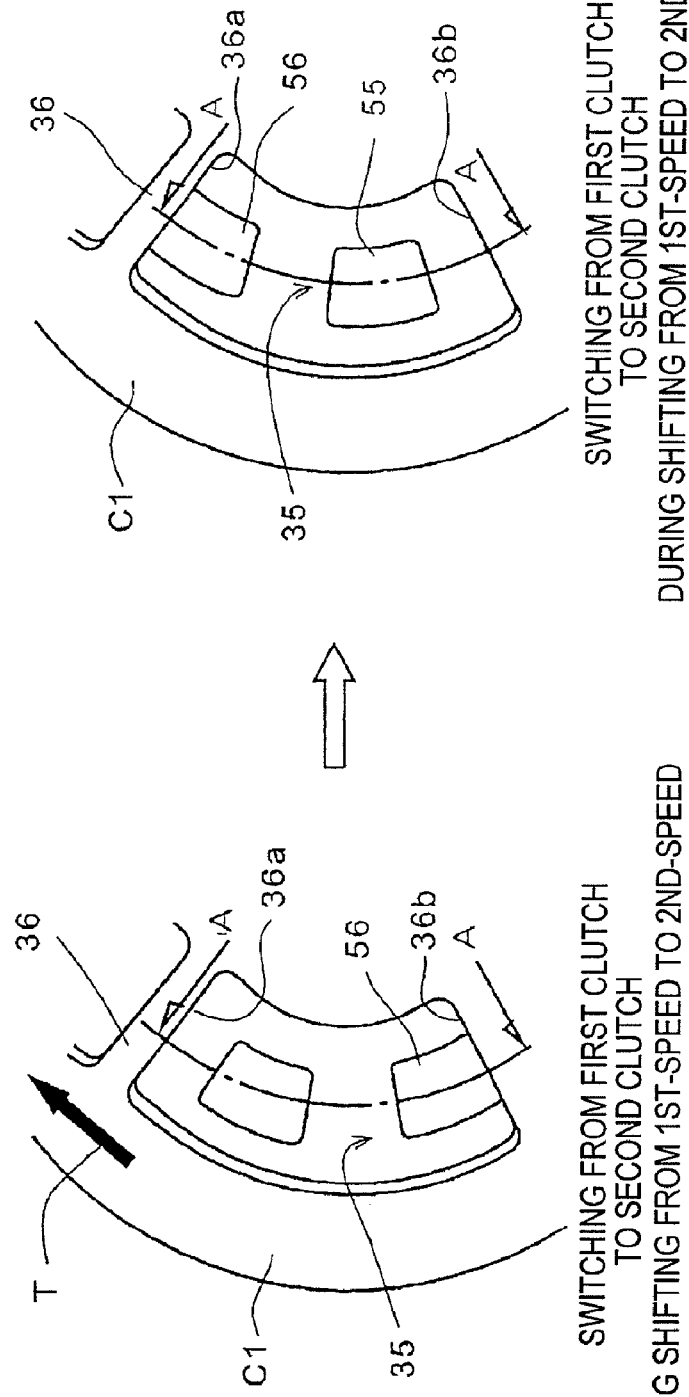

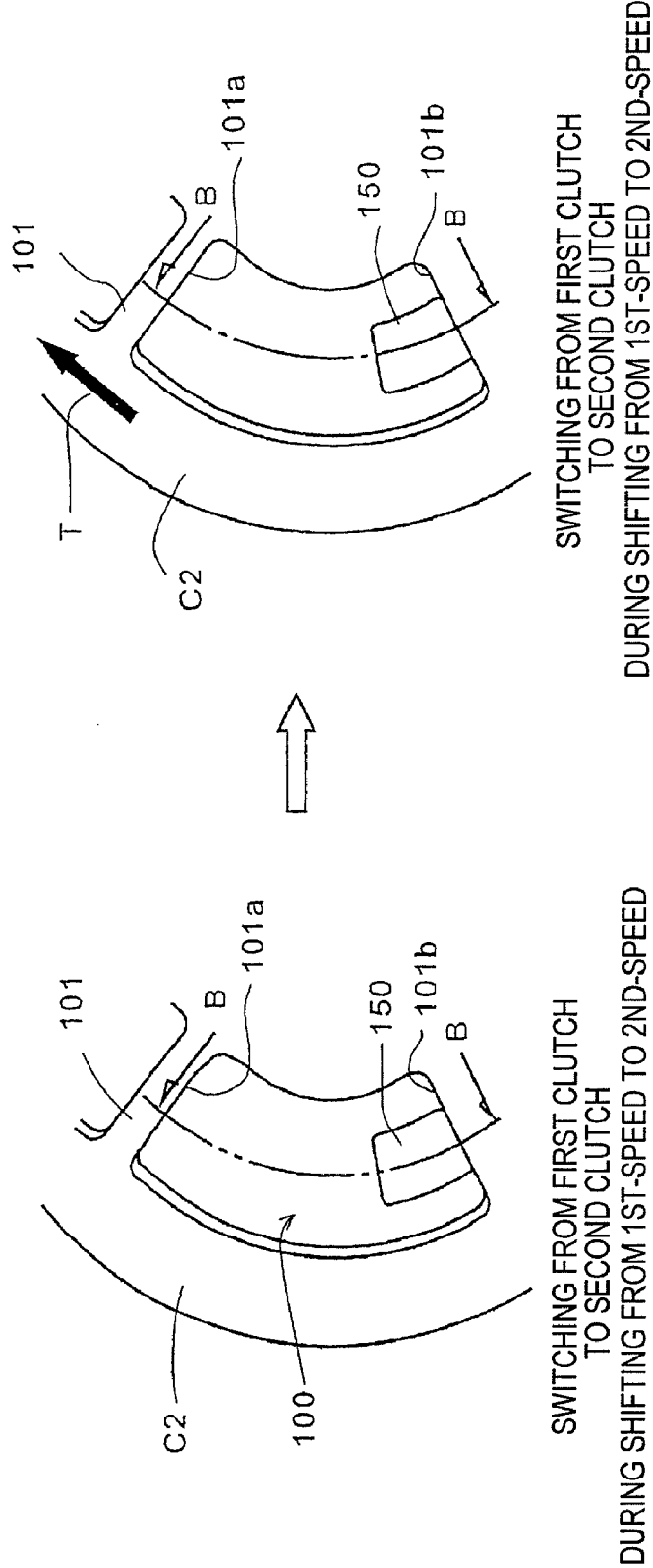

SWITCHING FROM FIRST CLUTCH TO SECOND CLUTCH DURING SHIFTING FROM 1ST-SPEED TO 2ND-SPEED

SWITCHING FROM FIRST CLUTCH TO SECOND CLUTCH DURING SHIFTING FROM 1ST-SPEED TO 2ND-SPEED

TWIN CLUTCH SPEED-CHANGE APPARATUS

CROSS-REFERENCE TO RELATED APPLICATION

The present application claims priority under 35 U.S.C. §119 to Japanese Patent Application No. 2007-255125, filed Sep. 28, 2007, the entire contents of which are hereby incorporated by reference.

BACKGROUND OF THE INVENTION

1. Field of the Invention

The present invention relates to twin clutch type speed-change apparatuses and, in particular, to a twin clutch type speed-change apparatus that reduces shift shock by providing a step on dog teeth provided on a speed-change gear sliding on a shaft.

2. Description of Background Art

Japanese Patent Laid-Open No. 2007-100739 discloses a multi-step transmission having a plurality of speed-change gear pairs configured such that shifting operation is executed by allowing shift forks parallel sliding on a main shaft and a countershaft to drive speed-change gears and sleeves slidable on the main shaft and the countershaft.

In particular, this document discloses a twin clutch type speed-change apparatus in which a main shaft is of a double structure consisting of an inner tube and an outer tube and which is provided with a first clutch and a second clutch that transmit a rotational drive force to the inner main shaft and the outer main shaft, respectively. In addition, this speed-change apparatus is configured to be provided with sleeves and speed-change gears axially driven by shift forks and to allow a dog clutch composed of a dog tooth and a dog hole to transmit an axial drive force to a gear coaxially adjacent to the speed-change gear.

The twin clutch type speed-change apparatus as disclosed in Japanese Patent Laid-Open No. 2007-100739 can execute shifting operation by switching the engaging state between the first clutch and the second clutch with a predetermined dog clutch remaining engaged. In this speed-change apparatus, a rotational drive force applied to the dog clutch remaining engaged during the shifting operation is changed, whereby the abutment surface between the dog tooth and the dog hole is changed to another abutment surface. There is a possibility that a flapping sound and/or shock may occur at that time.

SUMMARY AND OBJECTS OF THE INVENTION

It is an object of the present invention to solve the problem of the existing technique described above and to provide a twin clutch type speed-change apparatus that can reduce shift shock by providing a step on a dog tooth of a dog clutch provided on a speed-change gear sliding on a shaft.

According to an embodiment of the present invention, a twin clutch type speed-change apparatus includes a transmission having a plurality of gear pairs disposed between a main shaft and a countershaft. A twin clutch is provided on the main shaft, a rotational drive force from a power source is connected/disconnected between the transmission and the power source by the twin clutch. The main shaft includes an inner tube carrying odd speed-change step gears and an outer tube carrying even speed-change step gears. The twin clutch includes a first clutch adapted to connect/disconnect a rotational drive force transmitted to the inner tube and a second clutch adapted to connect/disconnect a rotational drive force to the outer tube. Each of the gear pairs includes an axially slidably attached slidable gear and axially non-slidably attached non-slidable gear to select one gear pair for transmitting the rotational drive force to the countershaft. Each of the slidable gears is provided on a corresponding one of the inner tube, and the outer tube and the countershaft and are each slid by a corresponding one of shift forks each engaging a corresponding one of the slidable gears to connect/disconnect the rotational drive force between the slidable gear and the non-slidable gear coaxially adjacent thereto.

The transmission is configured to be able to shift to an adjacent speed-change step by switching the engaging state of the twin clutch when the slidable gear is located at a predetermined position. A dog clutch is provided between the slidable gear and the non-slidable gear coaxially adjacent to the slidable gear so as to transmit the rotational drive force by engaging a dog tooth with a dog hole. The dog tooth is formed with at least two steps different in axial height from each other between a portion abutted against a lateral wall surface of the dog hole when the rotational drive force of the main shaft is transmitted by the dog clutch and a portion abutted against a lateral wall surface of the dog hole when the rotational drive force of the main shaft is not transmitted by the dog clutch.

According to an embodiment of the present invention, the steps are formed on dog teeth of a slidable gear adapted to transmit the rotational drive force of a first speed gear.

According to an embodiment of the present invention, the dog hole is formed in a general sector, the dog clutch is configured to be switched into an engagement state by engagement of two adjacent dog teeth with one dog hole, two kinds of dog teeth different in axial height from each other are arranged coaxially and alternately arranged on the slidable gear, and the steps are formed by end faces of the two adjacent dog teeth.

According to the embodiment of the present invention, the dog clutch is provided between the slidable gear and the non-slidable gear coaxially adjacent to the slidable gear so as to transmit the rotational drive force by engaging a dog tooth with a dog hole and the dog tooth is formed with at least two steps different in axial height from each other between a portion abutted against a lateral wall surface of the dog hole when the rotational drive force of the main shaft is transmitted by the dog clutch and a portion abutted against a lateral wall surface of the dog hole when the rotational drive force of the main shaft is not transmitted by the dog clutch. When the dog teeth approach the dog hole in engaging the dog clutch, the high dog tooth is first abutted against the inner wall and also the low dog tooth is then engaged.

Thus, while ensuring entering-easiness of the dog teeth in engaging the dog clutch, the circumferential size of the dog teeth is increased to reduce the circumferential gap formed between the dog hole and the dog teeth when the dog teeth are entered. Reducing the circumferential gap reduces backlash in the rotational direction occurring when the dog clutch is engaged. In this way, when shifting operation is executed by switching the engaging state of the twin clutch, it is possible to reduce slapping sound and/or shock otherwise occurring due to the abutment of the dog tooth against the lateral wall surface, reducing shift shock.

According to the embodiment of the present invention, the steps are formed on dog teeth of a slidable gear adapted to transmit the rotational drive force of a first speed gear. Therefore, in the minimum speed step where the variation of the rotational drive force tends to increase, slapping sound and shock during shifting can effectively be reduced.

According to the embodiment of the present invention, the dog hole is formed in a general sector, the dog clutch is configured to be switched into an engagement state by engagement of two adjacent dog teeth with one dog hole, two kinds of dog teeth different in axial height from each other are arranged coaxially and alternately arranged on the slidable gear, and the steps are formed by end faces of the two adjacent dog teeth. Thus, an unnecessary wasted portion is not formed between the adjacent dog teeth compared with the configuration where a step is provided on one dog tooth, thereby suppressing an increase in the weight of the slidable gear. In addition, it is possible to form the step of the dog teeth.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5(a) is a front view of a first-speed driven gear, and FIG. 5(b) a cross-sectional view taken along line D-D of FIG. 5(a);

FIG. 6 is a cross-sectional view taken along line E-E of FIG. 5(a);

FIGS. 10(a) and 10(b) are arrangement diagrams of a first-speed driven gear C1 and a fifth-speed driven gear C5 as viewed from the direction J of FIG. 9;

FIGS. 12(a) and 12(b) are arrangement diagrams of a second-speed driven gear C2 and a sixth-speed driven gear C6 as viewed from the direction K of FIG. 9;

DETAILED DESCRIPTION OF THE PREFERRED EMBODIMENTS

Figure 1:
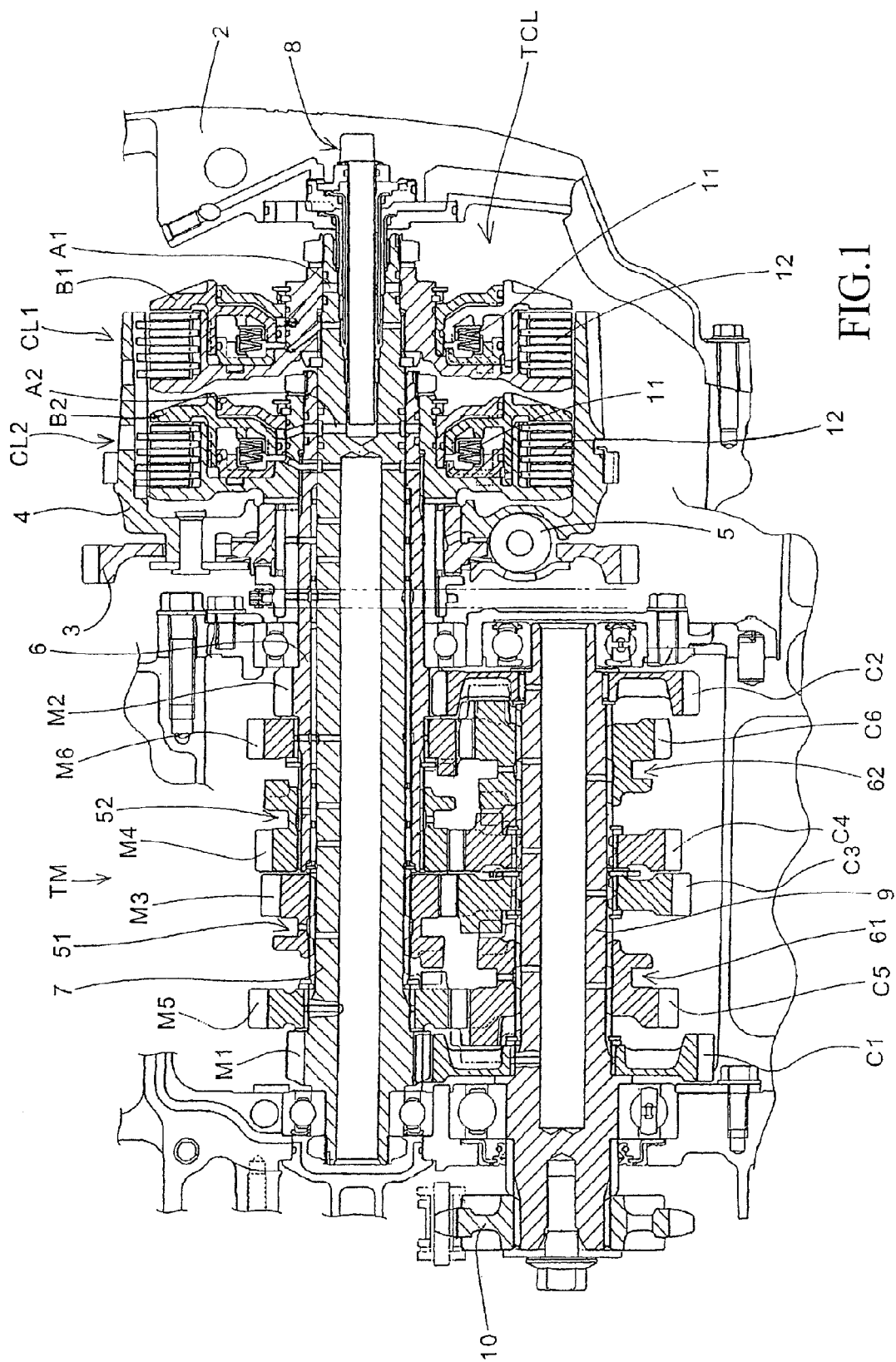
FIG. 1 is a cross-sectional view of a twin clutch type speed-change apparatus according to an embodiment of the present invention.
Figure 2:
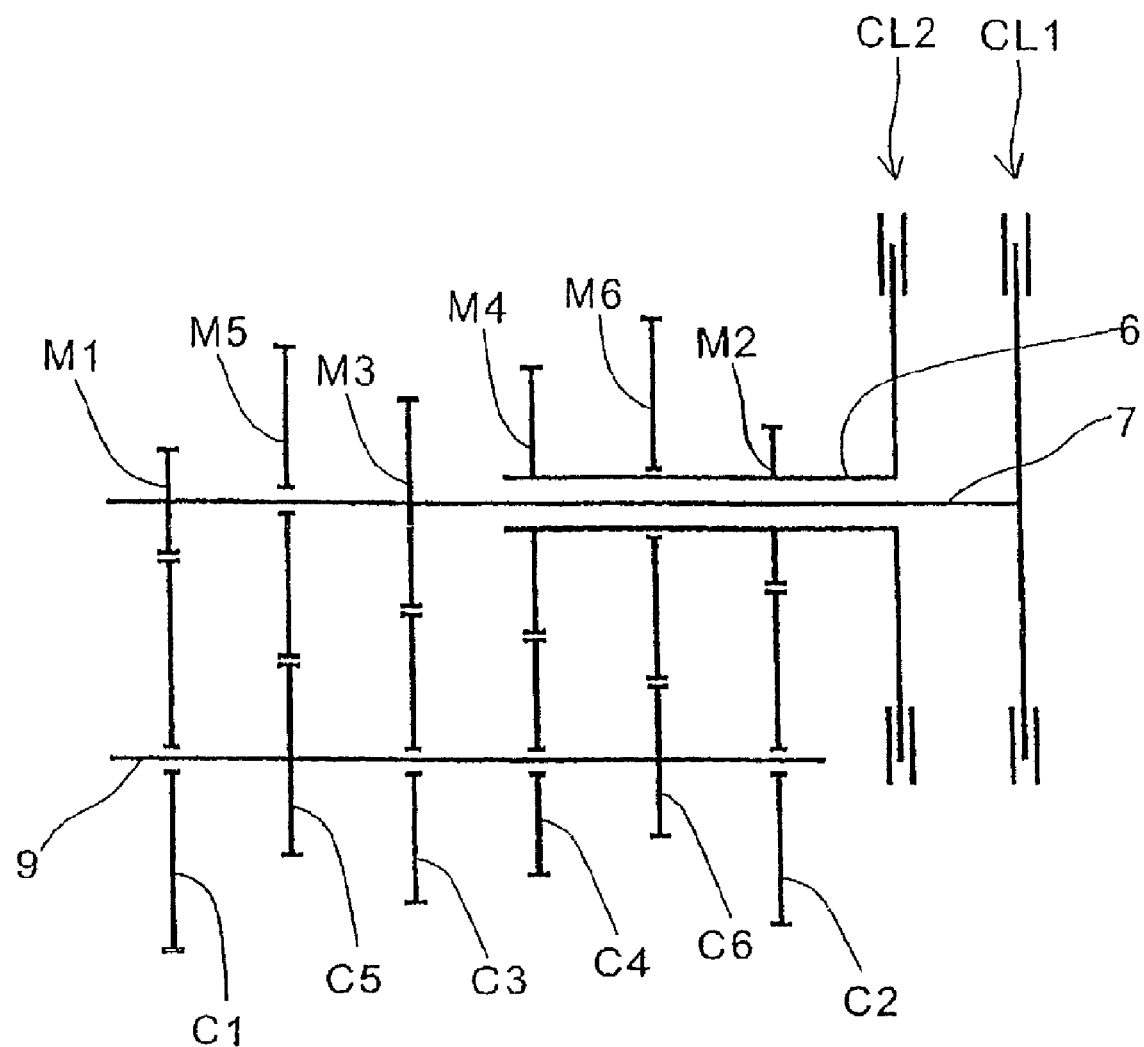
FIG. 2 is a skeleton view of $1^{st}$ to $6^{th}$ speed-change gears of the speed-change apparatus.

FIG. 1 is a cross-sectional view of a twin clutch type speed-change apparatus 1 according to an embodiment of the present invention. FIG. 2 is a skeleton diagram illustrating speed-change gear arrangement of the speed-change apparatus 1. The twin clutch speed-change apparatus includes a twin clutch TCL composed of a first clutch CL1 and a second clutch CL2, and a six-forward-speed sequential transmission TM. The speed-change apparatus is accommodated inside a crankcase 2 together with an engine (not shown) as a power source of a vehicle.

A rotational drive power is transmitted from a crankshaft (not shown) of the engine to a primary gear 3 having a shock absorbing mechanism 5. The rotational drive power is outputted therefrom to a countershaft 9 attached with a drive sprocket 10 through the twin clutch TCL, an outer main shaft 6 as an external tube, an inner main shaft 7 as an inner tube rotatably carried by the outer tube, and six gear pairs provided between the main shafts 6, 7 and a countershaft 9. The rotational driving force transmitted to the drive sprocket 10 is transmitted to a drive wheel (not shown) of a vehicle via a drive chain wound around the drive sprocket 10.

The transmission TM has six gear pairs provided between the main shafts and the countershaft. The transmission TM can select a gear pair through which the rotational drive force is outputted, based on the combination of the positions of slidable gears axially slidably carried on the respective shafts with the engagement/disengagement states of the first and second clutches CL1, CL2. The twin clutch TCL is disposed inside a clutch case 4 rotated integrally with the primary gear 3. The first clutch CL1 is non-rotatably mounted to the inner main shaft 7, whereas the second clutch CL2 is non-rotatably mounted to the outer main shaft 6. A clutch board 12 is disposed between the clutch case 4 and each of the clutches CL1, CL2. The clutch board 12 is composed of four clutch plates non-rotatably carried by the clutch case 4 and four friction plates non-rotatably carried by each of the clutches CL1, CL2.

The first and second clutches CL1, CL2 are each configured to receive hydraulic pressure supplied from a hydraulic pump driven by the rotation of the crankshaft to allow the clutch board 12 to cause a frictional force, thereby switching into the engaging state. A distributor 8 which forms two double-pipe hydraulic paths inside the inner main shaft 7 is buried in the wall surface of the crankcase 2. If hydraulic pressure is supplied via the distributor 8 to an oil path A1 formed in the inner main shaft 7, a piston B1 is slid leftward in the figure against the elastic force of an elastic member 11 such as a spring or the like to switch the first clutch CL1 into the engaging state. Similarly, if hydraulic pressure is supplied to an oil path A2, a piston B2 is slid leftward to switch the second clutch CL2 into the engaging state. If the supplied hydraulic pressure is lowered, both the clutches CL1, CL2 are each returned to an original position by the elastic force of the elastic member 11. The supply of hydraulic pressure to the first or second clutches CL1, CL2 is executed by a solenoid valve or the like switching the destination of the hydraulic pressure constantly produced by the hydraulic pump driven by the crankshaft.

With such a configuration described above, the rotational drive force of the primary gear 3 rotates only the clutch case 4 unless hydraulic pressure is supplied to the first clutch CL1 or the second clutch CL2. If the hydraulic pressure is supplied, the outer main shaft 6 or the inner main shaft 7 is drivingly rotated integrally with the clutch case 4. Incidentally, the magnitude of the supply hydraulic pressure is adjusted at this time to create partial clutch engagement as well.

The inner main shaft 7 connected to the first clutch CL1 carries drive gears M1, M3, M5 for odd speed steps (first-speed, third-speed and fifth-speed). The first-speed drive gear M1 is formed integrally with the inner main shaft 7. The third-speed drive gear M3 is attached to the inner main shaft so as to be axially slidable and incapable of circumferential rotation. The fifth speed drive gear M5 is attached to the inner main shaft so as to be incapable of axial slide and circumferentially rotatable.

The outer main shaft 6 connected to the second clutch CL2 carries drive gears M2, M4, M6 for even speed steps (second-speed, fourth-speed and sixth-speed). The second-speed drive gear M2 is formed integrally with the outer main shaft 6. The fourth-speed drive gear M4 is attached to the outer main shaft so as to be axially slidable and incapable of circumferential rotation. The sixth speed drive gear M6 is attached to the outer main shaft so as to be incapable of axial slide and circumferentially rotatable.

The countershaft 9 carries driven gears C1, C2, C3, C4, C5 and C6 meshed with the drive gears M1, M2, M3, M4, M5, and M6, respectively. The first-through fourth-speed driven gears C1 through C4 are attached to the countershaft so as to be incapable of axial slide and circumferentially rotatable. The fifth- and sixth-speed driven gear C5, C6 are attached to the countershaft so as to be axially slidable and incapable of circumferential rotation.

The drive gears M3, M4 and driven gears C5, C6 of the gear trains described above, i.e., the axially slidable "slidable gears" are each configured to be slid along with the operation of a corresponding one of the shift forks described later. The slidable gears are respectively formed with engaging grooves 51, 52, 61 and 62 adapted to engage the claw portions of the shift forks.

The speed-change gears (the drive gears M1, M2, M5, M6 and the driven gears C1-C4) other than the slidable gears described above, i.e., the axially non-slidable "non-slidable" gears are configured to execute connection/disconnection of the rotational drive power with the adjacent slidable gears. The twin clutch type speed-change apparatus 1 according to the embodiment described above can optionally select one gear pair transmitting rotational drive force through the combination of the positions of the slidable gears with the engagement/disengagement of the first and second clutches CL1, CL2.

The first clutch CL1 executes the connection/disconnection of the rotational drive force of the odd speed-change steps (first-speed, third-speed and fifth-speed). On the other hand, the second clutch CL2 executes the connection/disconnection of the rotational drive force of the even speed steps (second-speed, fourth-speed and sixth-speed). Thus, if upshifting is sequentially executed, the engaging states of the first and second clutches CL1, CL2 are alternately switched.

In the twin clutch speed-change apparatus 1 of the present embodiment, a dog clutch mechanism is applied to a structure of connecting or disconnecting a rotational drive force between the slidable gear and the non-slidable gear. This dog clutch mechanism transmits the rotational drive force through meshing of the respective recessed and projected shapes of a dog tooth and a dog aperture. Thus, the simple configuration can transmit a drive force with less transmission loss. This can achieve the downsizing and weight-reduction of the twin clutch type speed-changing apparatus 1 by more simplifying the configuration of the transmission, compared with the configuration provided with a synchromesh mechanism between a slidable gear and a non-slidable gear to synchronize the rotations thereof.

Figure 3:
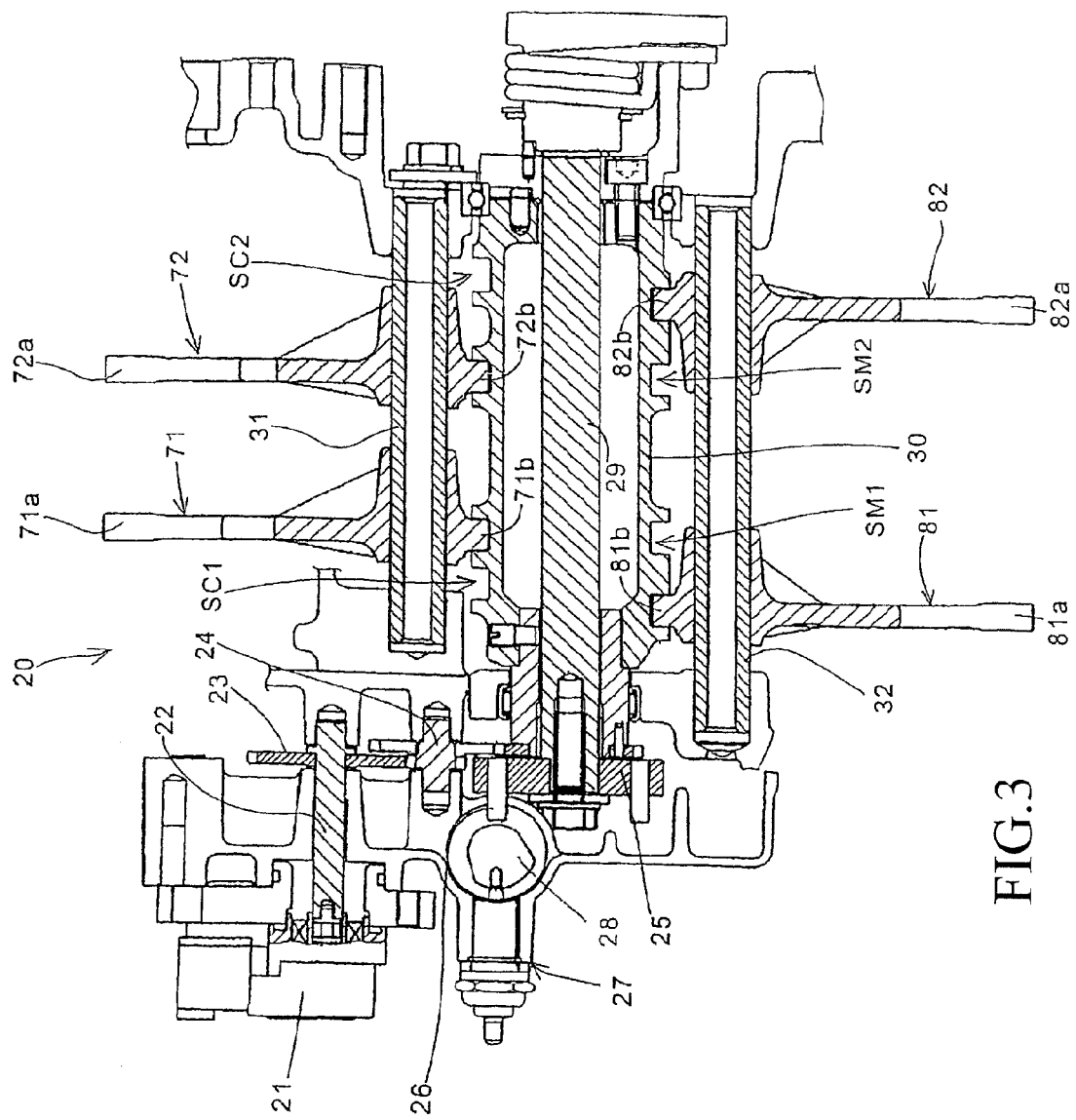
FIG. 3 is a cross-sectional view of a shifting mechanism which drives slidable gears of a transmission.
Figure 4:
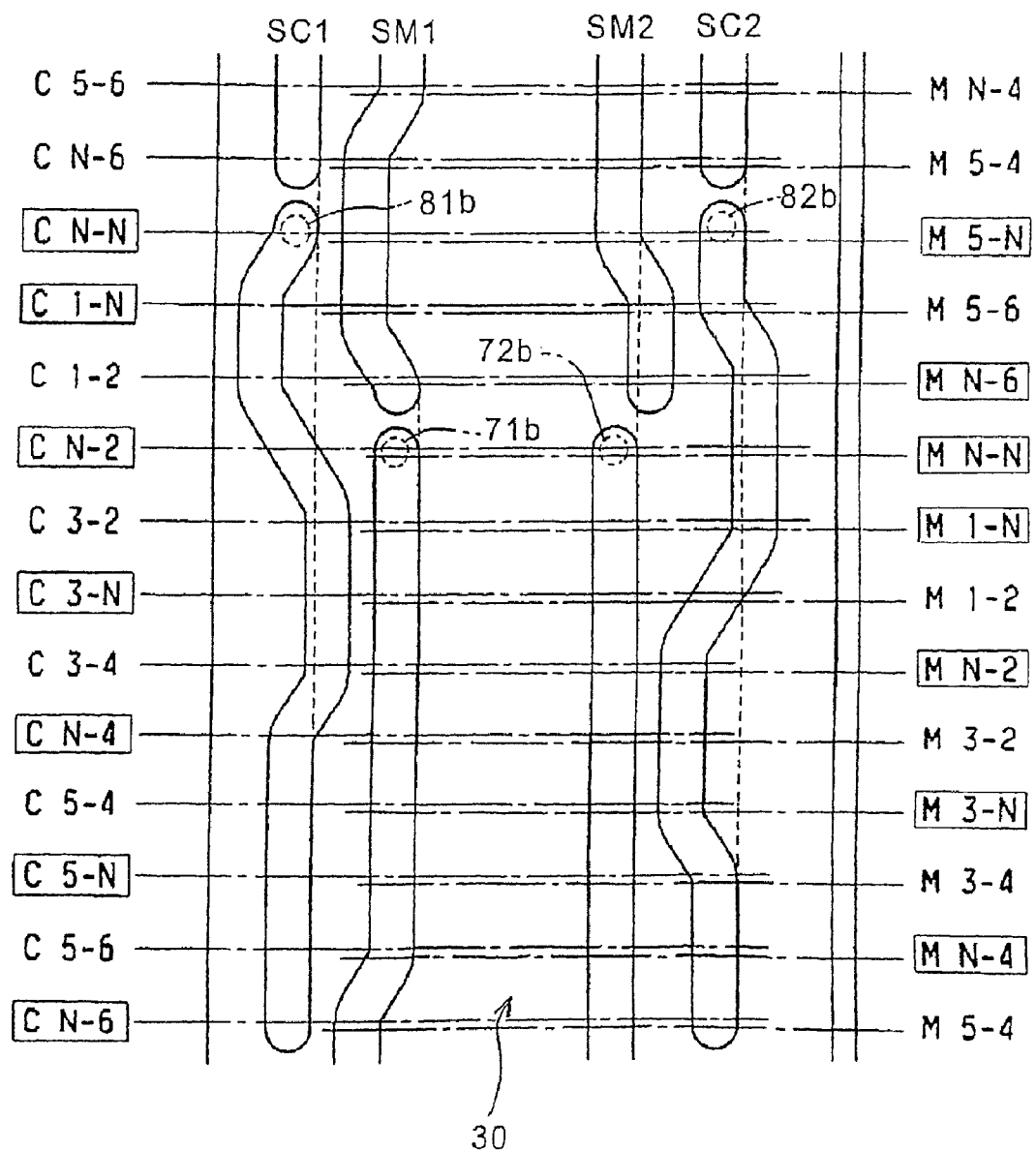
FIG. 4 is a development view illustrating the shapes of guide grooves of a shift drum.

FIG. 3 is a cross-sectional view of a shifting mechanism 20 which drives the slidable gears of the transmission. FIG. 4 is a development view illustrating the shapes of the guide grooves on a shift drum 30. To drive the four slidable gears mentioned above, the shifting mechanism 20 of the embodiment is provided with four shift forks 71, 72, 81, 82, specifically, the shift forks 71, 72 being slidably attached to the guide shaft 31, the shift forks 81, 82 being slidably attached to the guide shift 32. The four shift forks are provided with respective guide claws (71a, 72a, 81a, 82a) engaged with the corresponding slidable gears and with cylindrical projections (71b, 72b, 81b, 82b) engaged with the corresponding guide grooves formed on the shift drum 30.

The guide shaft 31 is attached with the shift fork 71 engaged with the third speed drive gear M3 and with the shift fork 72 engaged with the fourth speed drive gear M4. The other guide shaft 32 is attached with the shift fork 81 engaged with the fifth-speed driven gear C5 and with the shift fork 82 engaged with the sixth-speed driven gear C6.

Guide grooves SM1 and SM2 engaged with the main shaft side shift forks 71 and 72, respectively, and guide grooves SC1 and SC2 engaged with the countershaft side shift forks 81 and 82 are formed in the surface of the shift drum 30 disposed parallel to the guide shafts 31, 32. Thus, the slidable gears M3, M4, C5 and C6 are each driven along a corresponding one of the respective shapes of the four guide grooves along with turning of the shift drum 30.

The shift drum 30 is turnably driven to a predetermined position by an electric motor 21 as an actuator. The rotational drive force of the electric motor 21 is transmitted to a shift drum shaft 29 supporting the hollow cylindrical drum 30 via a first gear 23 secured to a rotational shaft 22 and via a second gear 24 meshed with the first gear 23. The turned position of the shift drum 30 is detected by the shift position sensor 27. Specifically, the shift position sensor 27 detects it through the turned position of a sensor cam 28 turned by sensor pins 26 buried in a sensor plate 25 secured to the shift drum shaft 29.

With such a configuration described above, the twin clutch type speed-change apparatus 1 parallelly exercises the turning drive control on the shift drum 30 and the engagement/disengagement control on the twin clutch TCL. This makes it possible to execute automatic gear shifting in response to engine revolutions and to vehicle speed or semiautomatic gear shifting subjected to rider's shifting operation by a shifting switch or the like.

A description is given of the positional relationship between the turning position of the shift drum 30 and the four shift forks with reference to the development view of FIG. 4. The guide shafts 31, 32 are disposed at respective positions spaced circumferentially apart from each other at about 90° with reference to the turning shaft of the shift drum 30. For example, if the turning position of the shift drum 30 is at neutral (N), the shift forks 81, 82 are located at a position indicated with "C N-N" on the left of the figure, whereas the shift forks 71, 72 are located at a position indicated with "M N-N" on the right in the figure. In this figure, a broken line circle indicates the position of the cylindrical projection (71b, 72b, 81b, 82b) in each shift fork at the time of neutral. The predetermined turning positions downwardly continuous from indication "C N-N" of the left of the figure are provided at 30° intervals. Similarly, the predetermined turning positions downwardly continuous from indication "M N-N" on the right of the figure are provided at 30° intervals.

The sliding positions of the shift forks determined by the associated guide grooves are such that the guide grooves SM1, SM2 on the main shaft side each assume two positions, "the left position" and "the right position", whereas the guide grooves SC1, SC2 on the countershaft side each assume three position, "the left position", "the middle position" and "the right position".

The shift forks during neutral are located as follows: the shift fork 81: middle position, the shift fork 82: middle position, the shift fork 71: right position: and the shift fork 72: left position. This state is such that the four slidable gears driven by the respective associated shift forks are each not meshed with a corresponding one of the adjacent non-slidable gears. Thus, even if the first and second clutches CL1, CL2 are each engaged, the rotational drive force of the primary gear 3 is not transmitted to the countershaft 9.

If the shift drum 30 is turned to the position ("C 1-N" and "M 1-N") corresponding to the first-speed gear from the neutral position mentioned above, the shift fork 81 is switched from the middle position to the left position to cause the fifth-speed driven gear C5 to switch to the left position from the middle position. This allows the fifth-speed driven gear C5 to mesh with the first-speed driven gear C1 via the dog clutch, providing the rotational drive force-transmittable state. In this state, if the first clutch CL1 is next switched to the engaging state, the rotational drive force is transmitted in the order of the inner main shaft 7, the first-speed drive gear M1, the first-speed driven gear C1, the fifth-speed driven gear C5 and the countershaft 9, and outputted from the drive sprocket 10.

When the upshifting to the first-speed gear is completed, the shift drum 30 is automatically turned in the upshifting direction by 30°. This operation is called "preliminary upshifting" which intends to complete shifting only by switching the engaging state of the twin clutch TCL when a command is issued to upshift from the first speed to the second speed. This preliminary upshifting allows the two guide shafts to move to the respective positions of "C 1-2" and "M 1-2" indicated on the left and right, respectively, of the figure relatively to the shift drum 30.

The changes of the guide grooves resulting from the preliminary upshifting are such that only the guide groove SC2 is switched from the middle position to the right position. This allows the shift fork 82 to be moved to the right position, thereby causing the driven gear C6 to mesh with the driven gear C2 via the dog clutch. At the time of completing the preliminary upshifting from the first speed to the second speed, since the second clutch CL2 is in the disengaging state, the outer main shaft 6 is turned in a following manner by the viscosity of the lubricating oil filled between the inner main shaft 7 and the outer main shaft 6.

The sliding operation of the driven gear C6 by the preliminary upshifting as described above completes a preparation for transmitting the rotational drive force via the second-speed gear. If a command is issued to upshift from the first speed to the second speed in this state, the first clutch CL1 is disengaged while the second clutch CL2 is switched to the engaging state. This switching operation of the twin clutch TCL instantaneously outputs the rotational drive force via the second-speed gear.

When the shifting operation from the first-speed to the second-speed is completed, the preliminary upshifting is executed to complete the shifting operation from the second speed to the third speed only by the switching of the twin clutch TCL. In the preliminary upshifting from the second-speed to the third-speed, the countershaft side guide shaft is moved to the position "C 3-2" from "C 1-2" indicated on the left of the figure, while the main shaft side guide shaft is moved to the position "M 3-2" from "M 1-2" on the right of the figure. The changes of the guide grooves resulting from such movements are such that only the guide groove SC1 switches from the left position to the right position. This allows the shift fork 81 to be moved from the left position to the right position, thereby causing the fifth-speed driven gear C5 and the third-speed driven gear C3 to be meshed with each other via the dog clutch.

When the preliminary upshifting from the second-speed to the third-speed is completed, the engaging state of the twin clutch TCL is switched from the second clutch CL2 to the first clutch CL1. In other words, only the switching of the clutches provides the state where the shifting operation from the second speed to the third speed is executable. This preliminary upshifting can similarly be executed from then until the fifth-speed gear is selected.

During the preliminary upshifting from the second-speed to the third-speed described above, the guide groove SC1 passes the middle position of "C N-2" indicated on the left side of the figure, i.e., the position where the meshing of the dog clutch is not executed. The angle of the shift drum 30 is detected by the shift position sensor 27 at 30° intervals and the turning speed of the shift drum can minutely be adjusted by the electric motor 21. This can allow e.g., the turning speed from "C 1-2" to "C 1-2" indicated on the left of the figure, i.e., the speed encountered when the meshing of the dog clutch is released between the driven gears C1, C5 to differ from the turning speed from "C N-2" to "C 3-2", i.e., the speed encountered when the dog clutch is engaged between the driven gears C5, C3. In addition, this can execute "neutral-waiting" where the shift drum 30 stops for predetermined time at the position of "C N-2". Thus, it is possible to significantly reduce shift shock liable otherwise to occur at the time of the engagement/disengagement of the dog clutch. Further, the drive timing and drive speed of the shift drum 30 can sequentially be adjusted according to the speed-change steps and engine revolutions during shifting.

Figure 7A:
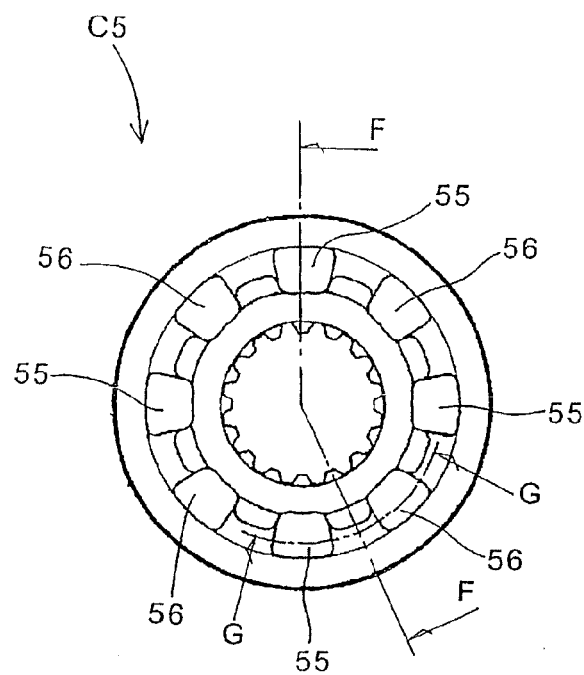
FIG. 7(a) is a front view of a fifth-speed driven gear.
Figure 7B:
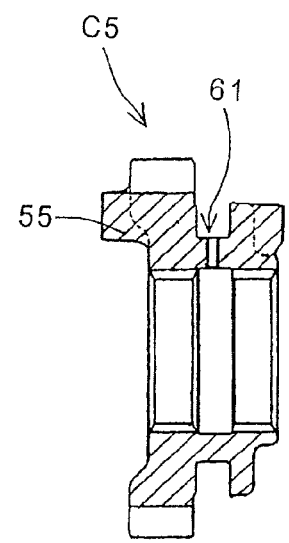
FIG. 7(b) is a cross-sectional view taken along line F-F of FIG. 7(a)
Figure 8:
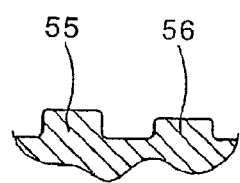
FIG. 8 is a cross-sectional view taken along line G-G of FIG. 7(a)

FIG. 5(a) is a front view of the first-speed driven gear C1 and FIG. 5(b) is a cross-sectional view taken along line D-D of FIG. 5(a) FIG. 6 is a cross-sectional view taken along line E-E of FIG. 5(a). FIG. 7(a) is a front view of the fifth-speed driven gear C5, and FIG. 7(b) is a cross-sectional view taken along line F-F of FIG. 7(a). FIG. 8 is a cross-sectional view taken along line G-G of FIG. 7(a). As described above, the driven gears C1, C5 are the gear pair and are axially meshed with each other by the dog clutch, thereby transmitting the rotational drive force transmitted from the inner main shaft 7 via the first speed drive gear M1 to the countershaft 9.

The first-speed driven gear C1 is a non-slidable gear that is attached to the countershaft 9 so as to be incapable of axial sliding and capable of circumferential rotation with respect to the countershaft 9. The first speed driven gear C1 is formed with four dog holes 35 each shaped in a general sector. The dog holes 35 are sectioned by four walls 36 rectangular in section.

The fifth-speed driven gear C5 is a slidable gear that is attached to the countershaft 9 so as to be axially slidable and incapable of circumferential rotation. The fifth-speed driven gear C5 is formed with eight dog teeth formed to have the same shape as viewed from the axial direction. The dog teeth are configured such that two types of dog teeth 55, 56 different in axial height from each other are alternately arranged. The dog teeth 55, 56 are circumferentially spaced apart from each other at regular intervals. When the dog teeth 55, 56 are meshed with the dog holes 35 of the slidable gear C1, the dog teeth 55, 56 adjacent to each other are inserted into one dog hole 35.

When the fifth-speed driven gear C5 approaches the rotating first-speed driven gear C1 in engaging the dog clutch, the long dog tooth 55 comes into abutment against the wall 36 before the short dog tooth 56. Thereafter, the two dog teeth 55, 56 come into engagement with a single dog hole 35. In this way, the rotational drive force of the first-driven gear C1 is transmitted to the fifth-speed driven gear C5 via the long dog teeth 55 stronger than the short dog teeth 56.

According to the configuration where the dog teeth engaged with the single dog hole is provided with the steps as described above, the circumferential gap defined between the wall and the dog tooth when the dog teeth is inserted can be reduced. During traveling at the first-speed, this circumferential gap is defined between the short dog tooth 56 and the wall 36. The gap is significantly small compared with that of the existing configuration where e.g., the dog clutch is composed of only four dog teeth 55. In the twin clutch type speed-change apparatus 1 according to the present embodiment, since the first clutch CL1 is switched to the second clutch CL2 when upshifting is executed from the first-speed to the second-speed, a plane where the dog tooth and the dog hole is abutted against each other is switched to a lateral surface of the short dog tooth 56 from a lateral surface of the long dog tooth 55. In this case, since the gap between the dog tooth 56 and the wall of the dog hole 35 is small, the occurrence of noise and shock during the abutment can significantly be reduced. Thus, it is possible to reduce the shift shock occurring during upshifting from the first-speed to the second-speed. Incidentally, in the present embodiment, the configuration where the dog teeth engaged with the single dog hole is provided with the steps is applied to only the dog clutch between the first-speed driven gear C1 and the fifth-speed driven gear C5.

Figure 9:
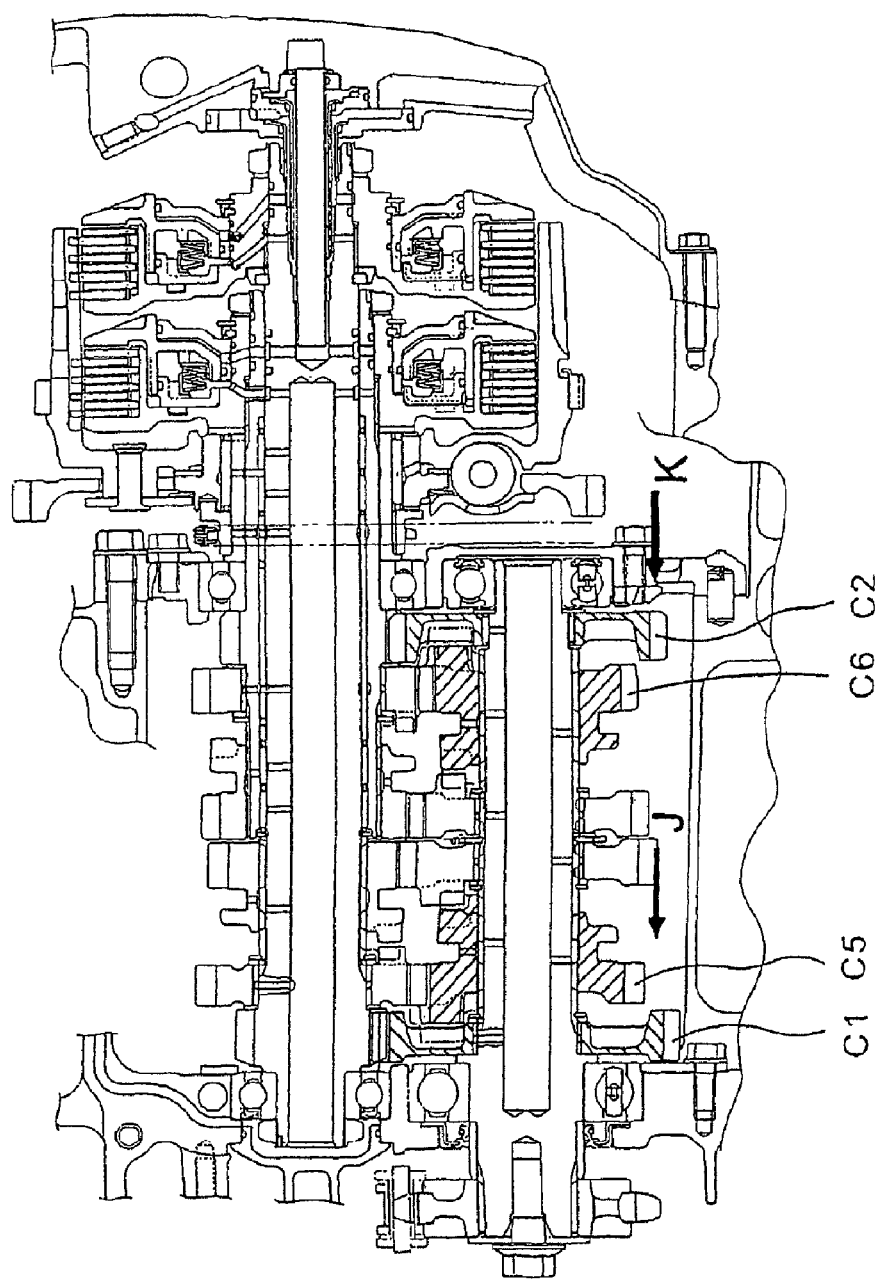
FIG. 9 is a cross-sectional view of the twin clutch type speed-change apparatus.
Figures 11A, 11B:
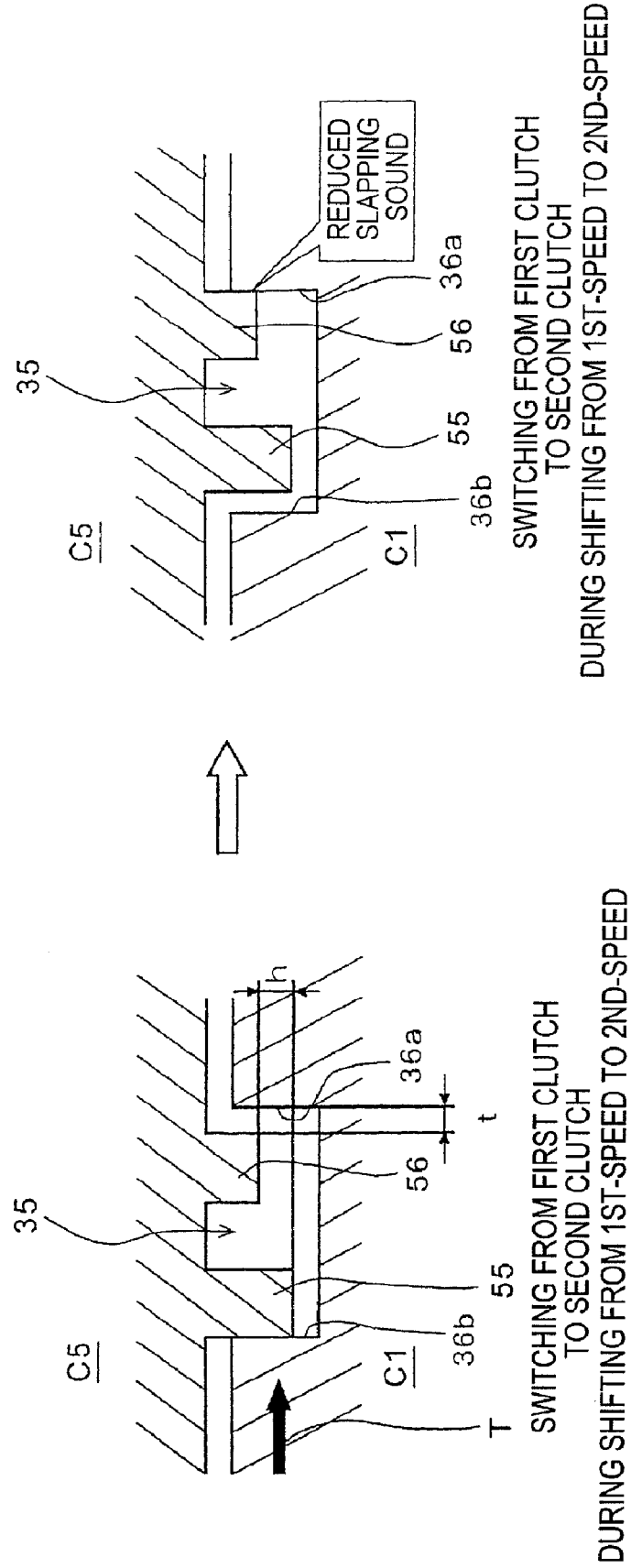
FIGS. 11(a) and 11(b) are cross-sectional views taken along line A-A of FIGS. 10(a) and 10(b)
Figure 13B:
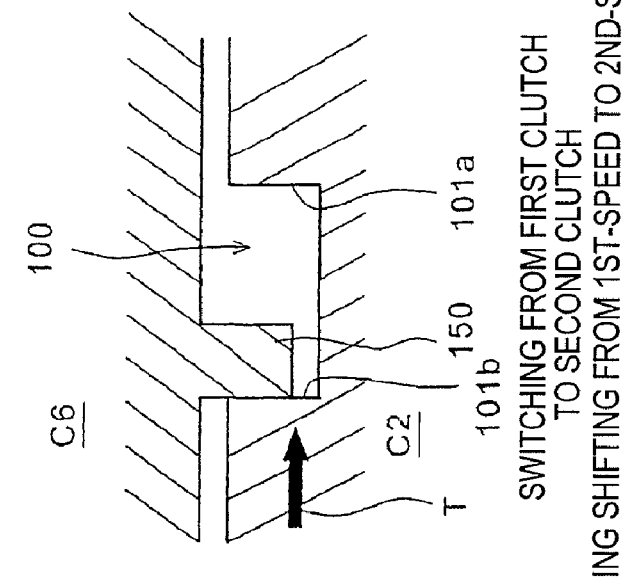
FIGS. 13(a) and 13(b) are cross-sectional views taken along line B-B of FIGS. 12(a) and 12(b)
Figure 13A:
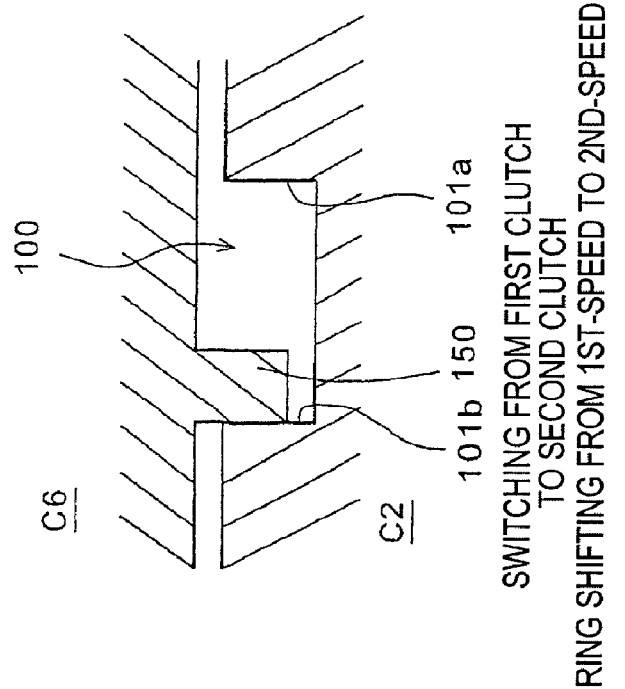

A detailed description will hereinafter be given of the operation of the dog clutch during the shifting operation from the first-speed to the second-speed with reference to FIGS. 9 to 13. FIG. 9 is a cross-sectional view of the twin clutch type speed-change apparatus. FIGS. 10(a) and 10(b) illustrate the positional relationship between the first-speed driven gear C1 and the fifth-speed driven gear C5 as viewed from the J-direction of FIG. 9. FIGS. 11(a) and (b) are cross-sectional views taken along line A-A of FIGS. 10(a) and 10(b). FIGS. 12(a) and (b) illustrate the positional relationship between the second-speed driven gear C2 and the sixth-speed driven gear C6 as viewed from the K-direction of FIG. 9. FIGS. 13(a) and 13(b) are cross-sectional views taken along line B-B of FIGS. 12(a) and 12(b).

FIG. 10(a) illustrates the state where the rotational drive force of the inner main shaft 7 is transmitted from the first-speed driven gear C1 to the fifth-speed driven gear C5 during the traveling on the first-speed gear with the first clutch CL1 engaged. In this case, the rotational drive force T of the inner main shaft 7 rotates the first-speed driven gear C1 in the clockwise direction shown in the figure and following the rotation the fifth-speed driven gear engaged with the first-speed driven gear via the dog clutch is rotated in the clockwise direction. As described above, the dog hole 35 is a generally sector recessed portion sectioned by the wall 36. The recessed portion is circumferentially formed with the lateral wall surfaces 36a, 36b. Thus, the abutment surface between the dog hole and the dog teeth during the first-speed traveling is formed of the lateral wall surface 36b and a lateral surface of the dog tooth 55.

As described above, the dog tooth 55 and the dog tooth 56 have respective axial lengths different from each other, whereby the step h is formed therebetween. This makes it possible to reduce the circumferential gap t formed between the lateral wall 36a and the dog tooth 56 when the dog teeth 55, 56 are inserted, while ensuring entering-easiness of the dog teeth in engaging the dog clutch. Incidentally, the step of the dog teeth may be provided on the end face of one generally sector dog tooth by increasing its circumferential size. However, as described above the technique for forming the two types of dog teeth 55, 56 having different axial heights provides simple machining. In addition, since an unnecessary wasted portion is not formed between the adjacent dog teeth, it is possible to suppress an increase in the weight of the fifth speed driven gear C5.

In response to a command to upshift from the first speed to the second speed, the first clutch CL1 is disengaged while the second clutch CL2 is engaged. In other words, the engaging state is switched from the first clutch CL1 to the second clutch CL2. Thus, as shown in FIG. 10(b), the abutment surface is switched to between the lateral wall surface 36a and the dog tooth 56. However, the gap t that serves as backlash in the rotational direction of the dog clutch is small. Thus, the rotational displacement between the dog teeth and the dog hole is reduced, which reduces slapping sound and/or a shock occurring during upshifting from the first-speed to the second-speed. Incidentally, during the second speed traveling in which the second clutch CL2 is engaged, the transmitting destination of the rotational drive force T is switched to the second speed driven gear C2. Therefore, the rotational drive force T is not applied to the short dog tooth 56.

A description is next given of the relationship between the second-speed driven gear C2 and the sixth-speed driven gear C6 during the upshifting from the first speed to the second speed with reference to FIGS. 12(a), 12(b), 13(a) and 13(b). FIG. 12(a) illustrates the state of traveling on the first-speed gear in which the first clutch CL1 is engaged. Similarly to the first-speed driven gear C1, the dog hole 100 of the second-speed driven gear C2 is formed as a generally sector recessed portion sectioned by a wall 101. In addition, the dog hole 100 is circumferentially formed with lateral wall surfaces 101a, 101b. The dog tooth 150 of the sixth-speed driven gear C6 is formed in the same shape as the existing one having no stepped structure.

During the first-speed traveling, the rotational drive power is not applied to the second-speed driven gear C2 and to the sixth-speed driven gear from the outer main shaft 6. At this time, the outer main shaft 6 is rotated in a following manner by the viscosity of the lubricating oil filled between the inner main shaft 7 and the outer main shaft 6. This rotates the second-speed driven gear C2 in the clockwise direction. The rotational speed of the second-speed driven gear C2 is higher than that of the sixth-speed driven gear C6 rotated by the countershaft 9. Therefore, the abutment surface between the dog hole and the dog tooth during the first speed traveling is formed of the lateral wall surface 101b and a lateral surface of the dog tooth 150.

In response to a command to upshift from the first-speed to the second-speed, the engaging state is switched from the first clutch CL1 to the second clutch CL2. As shown in FIG. 12(b), the rotational drive force T of the outer crankshaft 6 is applied to the second-speed driven gear C2. Along with this application, the rotational drive force T is applied to between the lateral wall surface 101b and a lateral surface of the dog tooth 150. Thus, the abutment surface of the dog clutch provided between the second-speed driven gear C2 and the sixth-speed driven gear C6 remains unchanged even if the clutches are switched. For this reason, the dog tooth of the dog clutch adapted to transmit the rotational drive force of the second-speed gearing is not provided with the step structure.

Figure 14A:
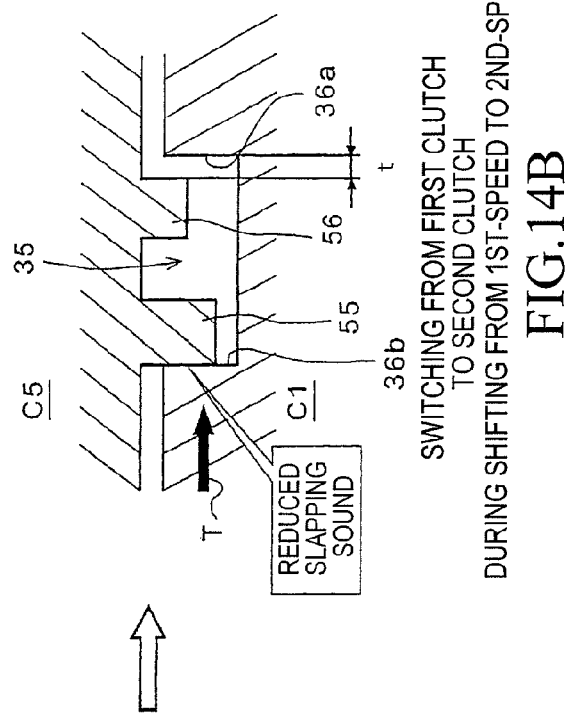
FIGS. 14(a) and 14(b) are arrangement diagrams illustrating operation of a dog clutch during shifting from the second-speed to the first-speed.
Figure 14B:
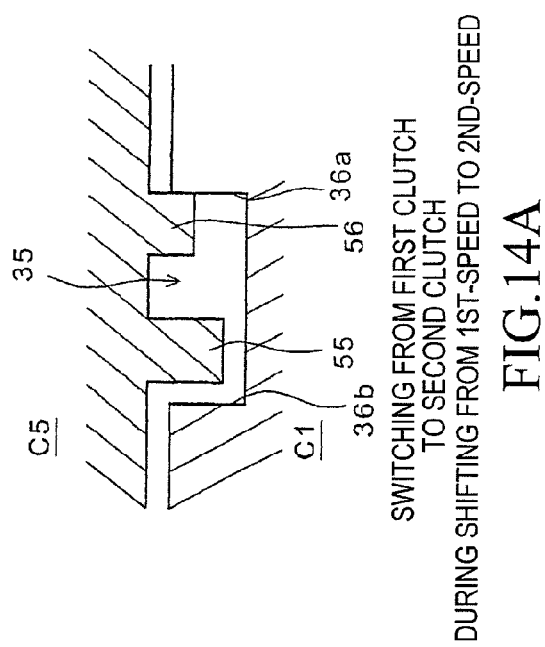
Figure 14C:
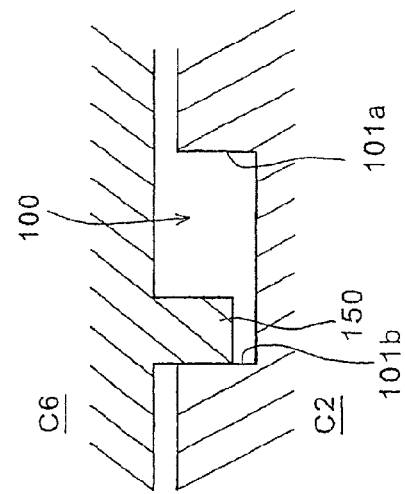
FIGS. 14(c) and 14(d) illustrate that the positional relationship between the second-speed and the sixth-speed remains constant during the same downshifting.
Figure 14D:
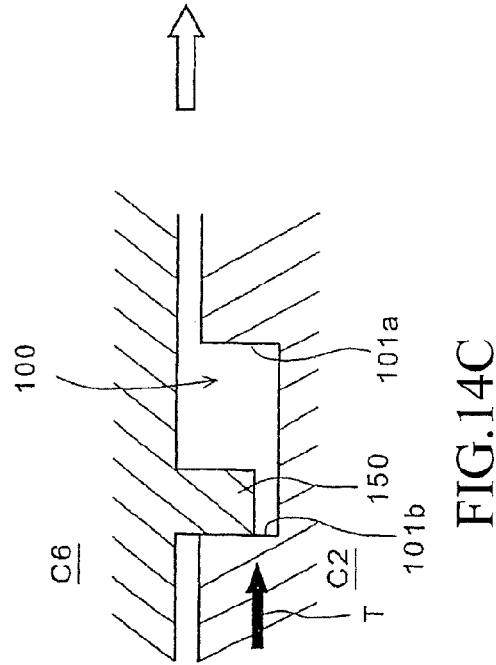

FIGS. 14(a) and 14(b) illustrating the positional relationship between the first-speed driven gear C1 and the fifth-speed driven gear C5 during downshifting from the second-speed to the first-speed, and FIGS. 14(c) and 14(d) illustrate positional relationship between the second-speed driven gear C2 and the sixth-speed driven gear C6 during the same downshifting. When the downshifting from the second-speed to the first-speed is executed, that is, when switching from the second clutch CL2 to the first clutch CL1 is executed, the operation is executed reversely to that of the upshifting from the first-speed to the second-speed. Thus, the abutment surface of the dog clutch is switched between the first-speed driven gear C1 and the fifth-speed driven gear C5, that is, the dog tooth 55 and the lateral wall surface 36b are abutted against each other. Also in this case, because of the small gap t, the shift shock can be reduced. Incidentally, the positional relationship between the second speed driven gear C2 and the sixth speed driven gear C6 applies to during the downshifting from the second-speed to the first-speed.

According to the twin clutch type speed-change apparatus described above, the dog tooth of the dog clutch is formed with the step between a portion that is abutted against the lateral wall face of the dog hole when the rotational drive force of the main shaft is transmitted by the dog clutch and a portion that is abutted against the lateral wall surface of the dog hole when the rotational drive force of the main shaft is not transmitted by the dog clutch. When the dog teeth approach the dog hole in engaging the dog clutch, the high dog tooth is first abutted against the lateral wall surface of the dog hole and then also the low dog tooth is engaged. Thus, while ensuring entering-easiness of the dog teeth in engaging the dog clutch, the circumferential size of the dog teeth is increased to reduce the circumferential gap formed between the dog hole and the dog teeth when the dog teeth are entered. Reducing the circumferential gap reduces backlash in the rotational direction occurring when the dog clutch is engaged. In this way, when shifting operation is executed by switching the engaging state of the twin clutch, it is possible to reduce slapping sound and/or shock occurring due to the abutment of the dog tooth against the lateral wall surface, reducing shift shock.

Incidentally, the numbers and/or shape of the dog teeth and dog holes of the dog clutch, the size of the step formed on the dog teeth and the like are not limited to the embodiment described above. For example, the dog teeth formed with the step may be formed on a gear other than a slidable gear adapted to transmit the rotational drive force via the first-speed gear. The number of steps of the dog teeth may be three or more. In addition, the number of gear trains of the transmission may include a plurality of forward speeds and a reverse speed. The two clutches constituting the twin clutch may each be arranged so as to be opposed to a corresponding one of the front and rear surfaces of the primary gear.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A twin clutch speed-change apparatus, comprising:
   a transmission having a plurality of gear pairs disposed between a main shaft and a countershaft, and
   a twin clutch provided on the main shaft, a rotational drive force from a power source being connected/disconnected between the transmission and the power source by the twin clutch, wherein:
   the main shaft is composed of an inner tube carrying odd speed-change step gears and an outer tube carrying even speed-change step gears;
   the twin clutch includes a first clutch adapted to connect/disconnect a rotational drive force transmitted to the inner tube and a second clutch adapted to connect/disconnect a rotational drive force to the outer tube;
   the gear pairs are each composed of an axially slidably attached slidable gear and axially non-slidably attached non-slidable gear to select one gear pair for transmitting the rotational drive force to the countershaft;
   the slidable gears are each provided on a corresponding one of the inner tube, the outer tube and the countershaft and are each slid by a corresponding one of shift forks each engaging a corresponding one of the slidable gears to connect/disconnect the rotational drive force between the slidable gear and the non-slidable gear coaxially adjacent thereto;
   the transmission is configured to be able to shift to an adjacent speed-change step by switching the engaging state of the twin clutch when the slidable gear is located at a predetermined position;
   a dog clutch is provided between the slidable gear and the non-slidable gear coaxially adjacent to the slidable gear so as to transmit the rotational drive force by engaging a dog tooth with a dog hole; and
   the dog tooth is formed with at least two steps different in axial height from each other between a portion abutted against a lateral wall surface of the dog hole when the rotational drive force of the main shaft is transmitted by the dog clutch and a portion abutted against a lateral wall surface of the dog hole when the rotational drive force of the main shaft is not transmitted by the dog clutch.

2. The twin clutch speed-change apparatus according to claim 1, wherein
   the steps are formed on dog teeth of a slidable gear adapted to transmit the rotational drive force of a first-speed driven gear (C1).

3. The twin clutch speed-change apparatus according to claim 2, wherein the slidable gear is a fifth-speed driven gear (C5).

4. The twin clutch speed-change apparatus according to claim 1, wherein
   the dog hole is formed in a general sector,
   the dog clutch is configured to be switched into an engagement state by engagement of two adjacent dog teeth with one dog hole,
   two kinds of dog teeth different in axial height from each other are arranged coaxially and alternately arranged on the slidable gear, and
   the steps are formed by respective end faces of the two adjacent dog teeth.

5. The twin clutch speed-change apparatus according to claim 2, wherein
   the dog hole is formed in a general sector,
   the dog clutch is configured to be switched into an engagement state by engagement of two adjacent dog teeth with one dog hole, two kinds of dog teeth different in axial height from each other are arranged coaxially and alternately arranged on the slidable gear, and the steps are formed by respective end faces of the two adjacent dog teeth.

6. The twin clutch speed-change apparatus according to claim 1, wherein the slidable gears include third-speed drive gear (M3), fourth-speed drive gear (M4), fifth-speed driven gear (C5), and sixth-speed driven gear (C6).

7. The twin clutch speed-change apparatus according to claim 4, wherein the dog hole formed in the general sector includes a recessed portion that is circumferentially formed with first and second lateral wall surfaces.

8. The twin clutch speed-change apparatus according to claim 5, wherein the dog hole formed in the general sector includes a recessed portion that is circumferentially formed with first and second lateral wall surfaces.

9. The twin clutch speed-change apparatus according to claim 7, wherein the two kinds of dog teeth include a long dog tooth and short dog tooth, and wherein the long dog tooth comes into abutment against the first lateral wall surface before the short dog tooth comes into abutment with the second lateral wall surface, and thereafter the two kinds of dog teeth come into engagement with the dog hole.

10. The twin clutch speed-change apparatus according to claim 8, wherein the two kinds of dog teeth include a long dog tooth and short dog tooth, and wherein the long dog tooth comes into abutment against the first lateral wall surface before the short dog tooth comes into abutment with the second lateral wall surface, and thereafter the two kinds of dog teeth come into engagement with the dog hole.

11. A twin clutch speed-change apparatus, comprising:

a transmission having a plurality of gear pairs disposed between a main shaft and a countershaft, and a twin clutch provided on the main shaft, a rotational drive force from a power source being connected/disconnected between the transmission and the power source by the twin clutch, wherein:

the main shaft is composed of an inner tube carrying odd speed-change step gears and an outer tube carrying even speed-change step gears;

the twin clutch includes a first clutch adapted to connect/disconnect a rotational drive force transmitted to the inner tube and a second clutch adapted to connect/disconnect a rotational drive force to the outer tube;

the gear pairs are each composed of an axially slidably attached slidable gear and axially non-slidably attached non-slidable gear to select one gear pair for transmitting the rotational drive force to the countershaft;

the slidable gears are each provided on a corresponding one of the inner tube, the outer tube and the countershaft and are each slid by a corresponding one of shift forks each engaging a corresponding one of the slidable gears to connect/disconnect the rotational drive force between the slidable gear and the non-slidable gear coaxially adjacent thereto;

the transmission is configured to be able to shift to an adjacent speed-change step by switching the engaging state of the twin clutch when the slidable gear is located at a predetermined position;

a dog clutch is provided between the slidable gear and the non-slidable gear coaxially adjacent to the slidable gear so as to transmit the rotational drive force by engaging a dog tooth with a dog hole; and the dog tooth is formed with at least two steps different in axial height from each other between a portion abutted against a lateral wall surface of the dog hole when the rotational drive force of the main shaft is transmitted by the dog clutch and a portion abutted against a lateral wall surface of the dog hole when the rotational drive force of the main shaft is not transmitted by the dog clutch, the apparatus further comprising:

a primary gear adapted to receive rotational drive power for the speed-change apparatus is disposed in a axial direction between the twin clutch and the gear pairs.

12. The twin clutch speed-change apparatus according to claim 11, wherein the steps are formed on dog teeth of a slidable gear adapted to transmit the rotational drive force of a first-speed driven gear (C1).

13. The twin clutch speed-change apparatus according to claim 12, wherein the slidable gear is a fifth-speed driven gear (C5).

14. The twin clutch speed-change apparatus according to claim 11, wherein the dog hole is formed in a general sector, the dog clutch is configured to be switched into an engagement state by engagement of two adjacent dog teeth with one dog hole, two kinds of dog teeth different in axial height from each other are arranged coaxially and alternately arranged on the slidable gear, and the steps are formed by respective end faces of the two adjacent dog teeth.

15. The twin clutch speed-change apparatus according to claim 12, wherein the dog hole is formed in a general sector, the dog clutch is configured to be switched into an engagement state by engagement of two adjacent dog teeth with one dog hole, two kinds of dog teeth different in axial height from each other are arranged coaxially and alternately arranged on the slidable gear, and the steps are formed by respective end faces of the two adjacent dog teeth.

16. The twin clutch speed-change apparatus according to claim 11, wherein the slidable gears include third-speed drive gear (M3), fourth-speed drive gear (M4), fifth-speed driven gear (C5), and sixth-speed driven gear (C6).

17. The twin clutch speed-change apparatus according to claim 14, wherein the dog hole formed in the general sector includes a recessed portion that is circumferentially formed with first and second lateral wall surfaces.

18. The twin clutch speed-change apparatus according to claim 15, wherein the dog hole formed in the general sector includes a recessed portion that is circumferentially formed with first and second lateral wall surfaces.

19. The twin clutch speed-change apparatus according to claim 17, wherein the two kinds of dog teeth include a long dog tooth and short dog tooth, and wherein the long dog tooth comes into abutment against the first lateral wall surface before the short dog tooth comes into abutment with the second lateral wall surface, and thereafter the two kinds of dog teeth come into engagement with the dog hole.

20. The twin clutch speed-change apparatus according to claim 18, wherein the two kinds of dog teeth include a long dog tooth and short dog tooth, and wherein the long dog tooth comes into abutment against the first lateral wall surface before the short dog tooth comes into abutment with the second lateral wall surface, and thereafter the two kinds of dog teeth come into engagement with the dog hole.

* * * * *